US012772345B2

(12) United States Patent
Do Rosario et al.

(10) Patent No.: US 12,772,345 B2
(45) Date of Patent: Oct. 20, 2026

(54) COMPOSITE PANE COMPRISING AN ELECTRICALLY HEATABLE CAMERA WINDOW

(71) Applicant: SAINT-GOBAIN GLASS FRANCE, Courbevoie (FR)

(72) Inventors: Jefferson Do Rosario, Aachen (DE); Stephan Gillessen, Alsdorf (DE)

(73) Assignee: SAINT-GOBAIN SEKURIT FRANCE, Thourotte (FR)

(*) Notice: Subject to any disclaimer, the term of this patent is extended or adjusted under 35 U.S.C. 154(b) by 661 days.

(21) Appl. No.: 18/259,739

(22) PCT Filed: Feb. 2, 2022

(86) PCT No.: PCT/EP2022/052376
§ 371 (c)(1),
(2) Date: Jun. 28, 2023

(87) PCT Pub. No.: WO2022/167434
PCT Pub. Date: Aug. 11, 2022

(65) Prior Publication Data
US 2024/0064873 A1 Feb. 22, 2024

(30) Foreign Application Priority Data
Feb. 5, 2021 (EP) .................................... 21155352

(51) Int. Cl.
*H05B 3/86* (2006.01)

(52) U.S. Cl.
CPC .......... *H05B 3/86* (2013.01); *H05B 2203/011* (2013.01); *H05B 2203/013* (2013.01)

(58) Field of Classification Search
None
See application file for complete search history.

(56) References Cited

U.S. PATENT DOCUMENTS 3,781,524 A * 12/1973 Levin ................ B32B 17/10036 219/203
4,894,513 A * 1/1990 Koontz ............ B32B 17/10036 219/203
(Continued)

FOREIGN PATENT DOCUMENTS

CN 102474912 A 5/2012
CN 106465487 A 2/2017
(Continued)

OTHER PUBLICATIONS

International Search Report as issued in International Patent Application No. PCT/EP2022/052376, dated Apr. 22, 2022.

*Primary Examiner* — Thor S Campbell
(74) *Attorney, Agent, or Firm* — CUSHMAN PARTNERS, LLC

(57) ABSTRACT

A composite pane with an electrically heatable camera window, which includes, inside the camera window, a first electrically conductive transparent coating for heating the camera window, wherein the first electrically conductive transparent coating is arranged on the first surface of the inner pane inside the camera window and has two busbars provided for connection to a voltage source, which are arranged on two opposite sides of the camera window such that when an electrical voltage is applied to the busbars, a current flows through the first electrically conductive transparent coating.

20 Claims, 3 Drawing Sheets

(56) References Cited

U.S. PATENT DOCUMENTS

Figure 1:
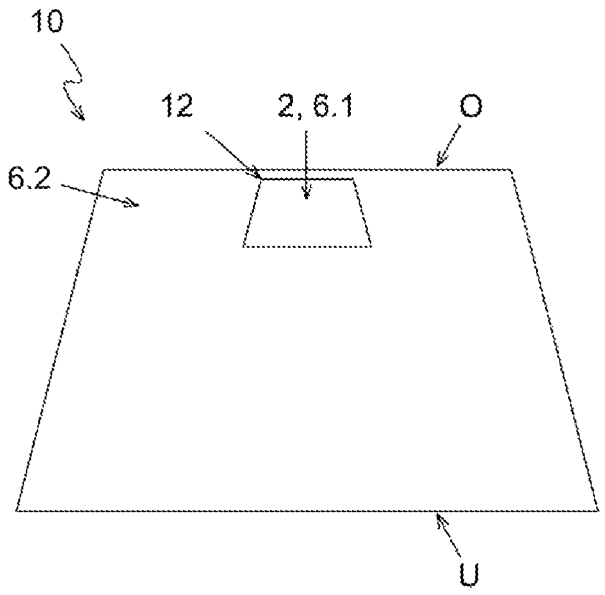

| | | | | |
|---|---|---|---|---|
| 6,492,619 | B1 * | 12/2002 | Sol | B32B 17/10761 52/171.2 |
| 6,734,396 | B2 * | 5/2004 | Sol | H05B 3/84 52/171.2 |
| 9,302,451 | B2 * | 4/2016 | Lisinski | B32B 17/10376 |
| 10,336,298 | B2 * | 7/2019 | Lisinski | B32B 17/10174 |
| 10,464,292 | B2 * | 11/2019 | Fischer | C03C 17/3636 |
| 2003/0019859 | A1 * | 1/2003 | Sol | B32B 17/10229 52/171.2 |
| 2003/0116551 | A1 * | 6/2003 | Sol | B32B 17/10761 219/203 |
| 2010/0314378 | A1 * | 12/2010 | Grunert | B32B 17/10036 219/203 |
| 2012/0103961 | A1 | 5/2012 | Offermann et al. | |
| 2016/0174295 | A1 * | 6/2016 | Klein | H05B 3/84 219/203 |
| 2017/0251526 | A1 * | 8/2017 | Schall | B23K 26/351 |
| 2017/0265254 | A1 * | 9/2017 | Schall | B32B 17/10036 |
| 2020/0230923 | A1 * | 7/2020 | Nishioka | B32B 17/10293 |
| 2021/0162716 | A1 * | 6/2021 | Gima | B32B 17/10293 |
| 2022/0152987 | A1 * | 5/2022 | Kolf | B32B 17/10348 |
| 2024/0064873 | A1 * | 2/2024 | Do Rosario | B32B 1/00 |

FOREIGN PATENT DOCUMENTS

| | | | |
|---|---|---|---|
| CN | 112203847 | A | 1/2021 |
| DE | 10 2012 018001 | A1 | 5/2013 |
| DE | 20 2021 102128 | U1 | 4/2021 |
| EP | 0 847 965 | B1 | 10/2004 |
| EP | 1 605 729 | A2 | 12/2005 |
| EP | 2 200 097 | A1 | 6/2010 |
| WO | WO 2011/069901 | A1 | 6/2011 |
| WO | WO 2017/198362 | A1 | 11/2017 |
| WO | WO 2019/186510 | A1 | 10/2019 |
| WO | WO 2021/209433 | A1 | 10/2021 |

* cited by examiner

COMPOSITE PANE COMPRISING AN ELECTRICALLY HEATABLE CAMERA WINDOW

CROSS-REFERENCE TO RELATED APPLICATIONS

This application is the U.S. National Stage of PCT/EP2022/052376, filed Feb. 2, 2022, which in turn claims priority to European patent application number 21155352.4 filed Feb. 5, 2021. The content of these applications are incorporated herein by reference in their entireties.

The invention relates to a composite pane with an electrically heatable camera window, in particular for camera systems, a method for production thereof, and use thereof.

Composite panes consisting of two or more glass or polymeric panes are used in vehicles as windshields, rear windows, side windows, and roof panels. One or more functional coatings that have infrared-reflecting properties, anti-reflection properties, or low-E properties can be arranged on individual sides of the panes.

Modern vehicles are increasingly equipped with sensors, in particular with a variety of driver assistance systems with optical sensors. These include, for example, optical cameras, but also radar systems, ultrasound sensors, and light detection and ranging (LiDaR). Camera systems are placed in motor vehicles behind the windshield in the passenger compartment. Thus, they offer a good view of the vehicle's surroundings and can detect dangerous situations and obstacles in road traffic in a timely manner.

The camera system is usually protected against weathering influences by appropriate panes; the panes should be as clean and fog-free as possible, thus ensuring functionality of the sensors. Since fogging and icing significantly affect the transmission of electromagnetic waves, the pane should be cleared of them as quickly as possible. Wiping systems ensure that the pane is cleared of water droplets and dirt particles. However, they are useless in icing conditions; consequently, when needed, brief heating of the affected segment of the pane that serves as the field of view for the camera is necessary.

EP 1 605 729 A2 discloses an electrically heatable pane with a camera window. The camera window is kept free of fog and ice by a heating device. The heating element is laminated into the pane at the position of the camera window, with the heating element arranged adjacent a field of view.

The object of the present invention consists in providing a composite pane with an electrically heatable camera window that provides improved heating performance of the camera window.

The object of the present invention is accomplished according to the invention by a composite pane with an electrically heatable camera window in accordance with claim 1. Preferred embodiments emerge from the subclaims.

The composite pane according to the invention with an electrically heatable camera window comprises at least an outer pane and an inner pane that are joined to one another flat via at least one thermoplastic intermediate layer. The outer pane has a first surface (I) facing away from the intermediate layer and a second surface (II) facing the intermediate layer. The inner pane has a first surface (III) facing the intermediate layer and a second surface (IV) facing away from the intermediate layer. In addition, the composite pane includes at least one optically transparent camera window and, inside the camera window, a first electrically conductive transparent coating for heating the camera window.

The first coating is particularly preferably applied substantially over the entire surface on the first surface (III) of the inner pane inside the camera window. In the context of the present invention, "substantially" means that the camera window can have additional decoated communication windows and the values can deviate by as much as 30%. The first coating has busbars provided for connection to a voltage source that are arranged on two opposite sides of the camera window such that when an electrical voltage is applied to the busbars, a current flows through the first coating.

The composite pane according to the invention provides a significant improvement in the form of rapid heating of the camera window. The direct arrangement of the low-impedance busbars in the camera window results in homogeneous heat distribution and fast-acting heating performance within the camera window.

Surprisingly, it has been demonstrated that such a composite pane according to the invention achieves significantly improved heating performance within the camera window compared to previously known windshields.

The composite pane can be used in many ways: In the case of a composite pane as a pane of a vehicle window, it can, for example, be a roof panel, in particular a windshield, a rear window, or a side window.

The composite pane according to the invention with an electrically heatable camera window is used to separate an interior from an external environment. It comprises the inner pane and the outer pane. In principle, all electrically insulating substrates that are thermally and chemically stable as well as dimensionally stable under the conditions of production and use of the composite pane according to the invention are suitable as the inner pane and the outer pane.

The inner pane and the outer pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyesters, polyvinyl chloride, and/or mixtures thereof. The inner pane and the outer pane are preferably transparent, in particular for use of the pane as a windshield or rear window of a vehicle or other uses where high light transmittance is desired.

In the context of the invention, "transparent" refers to a pane having transmittance greater than 70% in the visible spectral range. For panes not positioned within the driver's traffic-relevant field of view, for example, for roof panels, the transmittance can however also be much lower, for example, greater than 5%.

The thickness of the pane can vary widely and thus be ideally adapted to the requirements of the individual case. Preferably, panes with the standard thicknesses from 1.0 mm to 25 mm, preferably from 1.4 mm to 2.5 mm, are used for vehicle glass. The size of the pane can vary widely and is governed by the size of the application according to the invention. In vehicle construction, the inner pane and, optionally, the outer pane have, for example, customary areas from 200 $cm^2$ up to 20 $m^2$.

The composite pane can have any three-dimensional shape desired. Preferably, the three-dimensional shape has no shadow zones such that it can, for example, be coated by cathodic sputtering. Preferably, the substrates are planar or slightly or greatly curved in one or more spatial directions. In particular, planar substrates are used. The panes can be colorless or colored.

The intermediate layer preferably contains at least one thermoplastic, preferably polyvinyl butyral (PVB), ethylene vinyl acetate (EVA), and/or polyethylene terephthalate (PET). However, the thermoplastic intermediate layer can also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene propylenes, polyvinyl fluoride, and/or ethylene tetrafluoroethylene, or copolymers or mixtures thereof. The thermoplastic intermediate layer can be formed by one or even by multiple thermoplastic films arranged one atop another, with the thickness of a thermoplastic film preferably being from 0.25 mm to 1 mm, typically 0.38 mm or 0.76 mm.

The first surface (III) of the inner pane and the second surface (II) of the outer pane face one another and are joined to one another via the thermoplastic intermediate layer. The second surface (IV) of the inner pane and the first surface (I) of the outer pane face away from one another and from the thermoplastic intermediate layer.

The camera window is optically transparent, i.e., transmittance is preferably more than 70% in the wavelength range from 400 nm to 1300 nm. Preferably, the camera window occupies less than 10%, particularly preferably less than 5% of the pane surface. Preferably, the camera window has the shape of a square, a rectangle, a rhombus, a trapezoid, a hexagon, an octagon, a cross, an oval, or a circle.

The first electrically conductive coating is applied to the first surface (III) of the inner pane. In addition, a further electrically conductive coating can be applied to the second surface (II) of the outer pane.

Electrically conductive transparent coatings according to the invention are known, for example, from EP 0 847 965 B1 or WO 2017/198362 A1. They typically contain one or more, for example, two, three, or four, electrically conductive functional layers. The functional layers preferably contain at least one metal, for example, silver, gold, copper, nickel, and/or chromium or a metal alloy. The functional layers particularly preferably contain at least 90 wt.-% of the metal, in particular at least 99.9 wt.-% of the metal. The functional layers can consist of the metal or the metal alloy. The functional layers particularly preferably contain silver or a silver-containing alloy. Such functional layers have particularly advantageous electrical conductivity with, at the same time, high transmittance in the visible spectral range. The thickness of a functional layer is preferably from 5 nm to 50 nm, particularly preferably from 8 nm to 25 nm. In this range for the thickness of the functional layer, advantageously high transmittance in the visible spectral range and particularly advantageous electrical conductivity are achieved.

Typically, at least one dielectric layer is, in each case, arranged between two adjacent functional layers of the coating. Preferably, a further dielectric layer is arranged below the first and/or above the last functional layer. A dielectric layer contains at least one single layer of one dielectric material, for example, containing a nitride such as silicon nitride or an oxide such as aluminum oxide. Dielectric layers can, however, also include multiple individual layers, for example, individual layers of a dielectric material, smoothing layers, matching layers, blocking layers, and/or antireflection layers. The thickness of a dielectric layer is, for example, from 10 nm to 200 nm.

This layer structure is generally obtained by a sequence of deposition operations carried out by a vacuum process such as magnetron-enhanced cathodic sputtering.

Other suitable electrically conductive coatings preferably contain indium tin oxide (ITO), fluorine-doped tin oxide ($SnO_2$:F), or aluminum-doped zinc oxide (ZnO:Al).

In principle, the first electrically conductive transparent coating can be any coating that can be electrically contacted and that has sufficient transparency. In an advantageous embodiment, the electrically conductive coating is a layer or a layer structure of multiple individual layers with a total thickness less than or equal to 2 μm, particularly preferably less than or equal to 1 μm.

An advantageous electrically conductive coating according to the invention has sheet resistance from 0.4 ohm/square to 10 ohm/square. In a particularly preferred embodiment, the electrically conductive coating according to the invention has sheet resistance from 0.5 ohm/square to 1.5 ohm/square, in particular 1.3 ohm/square. Coatings with such sheet resistance is are particularly suitable for heating vehicle windows with typical on-board voltages of 12 V to 48 V or in electric vehicles with typical on-board voltages of up to 500 V.

The first electrically conductive transparent coating has two busbars for electrical contacting. The electrical contact of the electrically conductive coating to the electrical power supply is made via the busbars. The busbars can be arranged in the form of strips on two opposite sides of the first electrically conductive coating. In particular, they can be implemented as two approx. parallel strips. The busbars are spaced apart at a maximum distance of 40 cm from one another.

The busbars can have a width of 2 mm to 30 mm, particularly preferably of 4 mm to 20 mm. Such busbars can be readily implemented technically in the production process and have advantageous current-carrying capacity such that good results in terms of rapid heating are achieved. The length of the busbar is governed by the size of the camera window or the area to be heated. The length of the busbars is typically substantially equal to the length of the side edge of the first electrically conductive transparent coating, but can, however, be slightly smaller. In the case of such busbars, the longer of its dimensions is referred to as the length and the less long of its dimensions is referred to as the width. More than two busbars can also be arranged on the first electrically conductive coating, preferably in the edge region along two opposite side edges of the first electrically conductive transparent coating.

The layer thickness of the printed busbars is preferably from 5 μm to 40 μm, particularly preferably from 8 μm to 20 μm, and most particularly preferably from 8 μm to 12 μm. Printed busbars with these thicknesses are technically easy to realize and have advantageous current-carrying capacity. The specific resistance p a of the busbars is preferably from 0.8 μohm-cm to 7.0 μohm-cm and particularly preferably from 1.0 μohm-cm to 2.5 μohm-cm. Busbars with specific resistances in this range are technically easy to realize and have advantageous current-carrying capacity. Good results are achieved therewith.

In one embodiment of the invention, the printed busbars preferably contain at least one metal, one metal alloy, one metal compound, and/or carbon, particularly preferably a noble metal, and in particular silver. The printing paste preferably contains metallic particles, metal particles, and/or carbon and in particular noble metal particles such as silver particles. The electrical conductivity is preferably achieved through the electrically conductive particles. The particles can be situated in an organic and/or inorganic matrix such as pastes or inks, preferably as a printing paste with glass frits. Alternatively, however, the busbar can also be implemented as a strip of an electrically conductive foil. The busbar then contains, for example, at least aluminum, copper, tinned copper, gold, silver, zinc, tungsten, and/or tin or alloys thereof. The strip preferably has a thickness of 10 μm to 500 μm, particularly preferably of 30 μm to 300 μm.

Busbars made of electrically conductive foils with these thicknesses are technically easy to realize and have advantageous current carrying capacity. The strip can be electrically conductively connected to the electrically conductive structure, for example, via a solder compound, via an electrically conductive adhesive, or by direct placement. These materials and their thicknesses are particularly advantageous in terms of good conductivity of the busbars.

The busbars are electrically contacted by one or more supply lines. The supply line is preferably implemented as a flexible foil conductor (flat conductor, ribbon conductor). This means an electrical conductor whose width is significantly greater than its thickness. Such a foil conductor is, for example, a strip or band containing or made of copper, tinned copper, aluminum, silver, gold, or alloys thereof. The foil conductor has, for example, a width of 2 mm to 16 mm and a thickness of 0.03 mm to 0.1 mm. The foil conductor can have an insulating, preferably polymeric sheath, for example, based on polyimide. Foil conductors that are suitable for contacting electrically conductive coatings in panes have a total thickness of, for example, only 0.3 mm. Such thin foil conductors can be embedded without difficulty between the individual panes in the thermoplastic intermediate layer. One foil conductor ribbon can include multiple conductive layers electrically insulated from one another.

Alternatively, thin metal wires can also be used as electrical supply lines. The metal wires contain in particular copper, tungsten, gold, silver, or aluminum or alloys of at least two of these metals. The alloys can also contain molybdenum, rhenium, osmium, iridium, palladium, or platinum.

In another embodiment, the composite pane has a second electrically conductive transparent coating on the first surface (III) of the inner pane, wherein the first and the second electrically conductive transparent coating can be the same. Additionally, the first electrically conductive transparent coating and the second electrically conductive transparent coating can have infrared-reflecting properties.

In an advantageous embodiment, the composite pane according to the invention has a coating-free separation line for the electrical isolation of the first coating from the second coating. The separation line can surround the camera window at least partially, in particular completely. As a result, the first electrically conductive transparent coating is separated, inside the camera window, from the second electrically conductive transparent coating and is insulated therefrom free of short circuits. The second electrically conductive transparent coating is then arranged outside the camera window on the first surface (III) of the inner pane. Preferably, the second electrically conductive transparent coating can be current-free. In particular, it is not provided as a heating layer. The separation line can have a width of 30 μm to 200 μm, in particular of 80 μm to 120 μm.

In another advantageous embodiment of the invention, the camera window has at least one coating-free communication window for the transmission of electromagnetic radiation, with the communication window having an area of 10% to 30% of the area of the camera window.

The composite pane is preferably a window pane of a vehicle that is inserted or intended to be inserted into a window opening of the vehicle body.

In another aspect, the present invention includes the composite pane according to the invention as a windshield.

The inner pane and the outer pane are laminated to one another via the intermediate layer, for example, by autoclave methods, vacuum bag methods, vacuum ring methods, calender methods, vacuum laminators, or combinations thereof. The outer pane and the inner pane are usually joined under the action of heat, vacuum, and/or pressure.

"Inner pane" refers to that pane that is intended to face the interior of the vehicle in the installed position. "Outer pane" refers to that pane that is intended to face the external surroundings of the vehicle in the installed position.

In another aspect, the present invention includes a method for producing the composite pane according to the invention with an electrically heatable camera window, wherein

- the first electrically conductive transparent coating is applied to at least part of the first surface (III) of the inner pane,
- the two busbars are applied to the first electrically conductive transparent coating on two opposite sides of the camera window, wherein the busbars are arranged such that when an electrical voltage is applied to the busbars, a current flows through the first coating,
- the first surface (III) of the inner pane with the electrically conductive transparent coating is joined to the surface (II) of the outer pane via the thermoplastic intermediate layer.

The electrically conductive coating of the first electrically conductive transparent coating can be applied by methods known per se, preferably by magnetron-enhanced cathodic sputtering. This is particularly advantageous in light of simple, quick, economical, and uniform coating of the first pane. However, the electrically conductive coating can also be applied, for example, by vapor deposition, chemical vapor deposition (CVD), plasma-enhanced chemical vapor deposition (PECVD), or by wet-chemical methods.

The busbars are preferably applied by printing and baking an electrically conductive paste in a screen-printing method or in an inkjet method. Alternatively, the busbar can be applied, preferably placed, soldered, or glued, to the electrically conductive coating as a strip of an electrically conductive foil.

In screen-printing methods, the lateral shaping is accomplished by masking the fabric through which the printing paste with the metal particles is pressed. Through suitable shaping of the masking, the width of the busbar can, for example, be specified and varied in a particularly simple manner.

The production (decoating) of individual coating-free zones in the electrically conductive coating is preferably carried out by a laser beam. Methods for patterning thin metal foils are known, for example, from EP 2 200 097 A1.

The present invention further includes the use of the composite pane according to the invention with a heatable camera window in vehicles, watercraft, airplanes, and helicopters, preferably as a windshield and or rear window.

Within the scope of the present invention, all embodiments that are mentioned for individual features can also be freely combined, provided they are not contradictory.

The invention is explained in greater detail in the following with reference to figures and exemplary embodiments. The figures are a schematic representation and are not to scale. The figures in no way restrict the invention.

Figure 2:
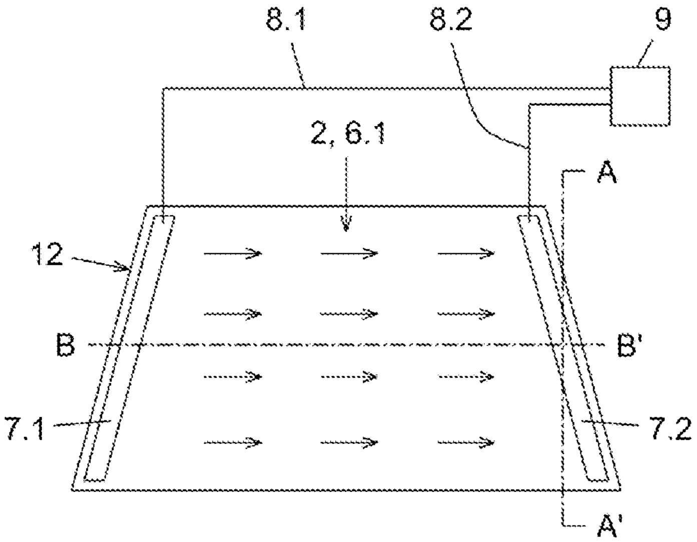
Figure 3:
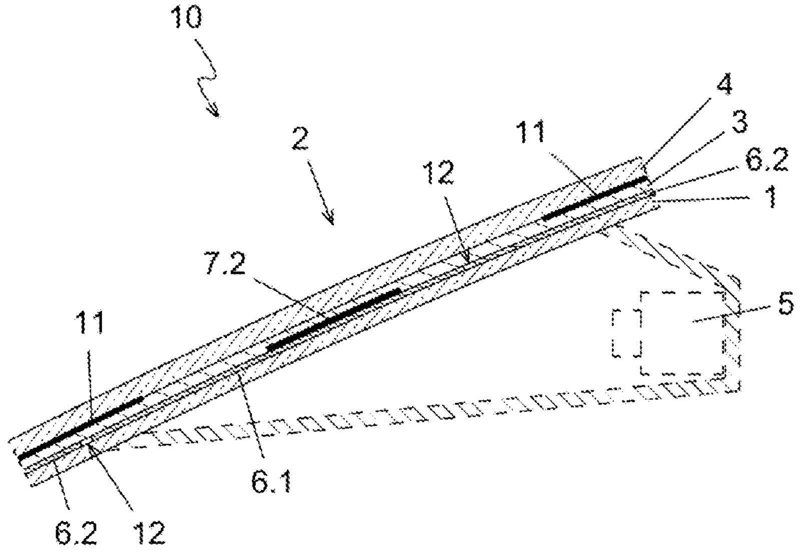
Figure 4:
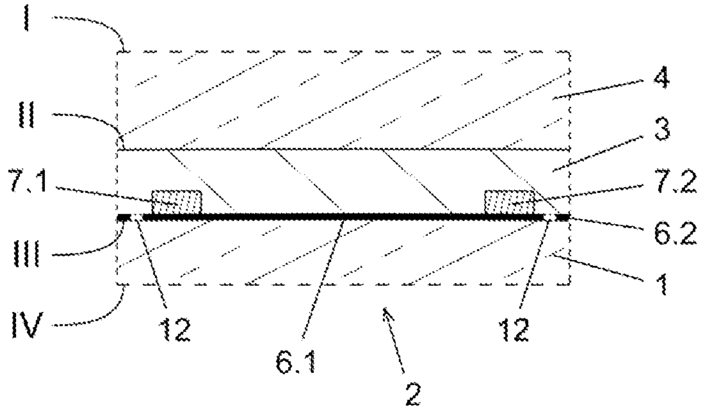
Figure 5:
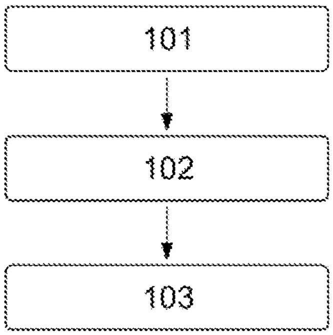

They depict:

FIG. 1 a plan view of an embodiment of the composite pane according to the invention with an electrically heatable camera window, FIG. 2 an enlarged representation of the camera window of FIG. 1, FIG. 3 a cross-sectional representation along the section line A-A' of FIG. 2, FIG. 4 a cross-sectional representation of the camera window along the section line B-B' of FIG. 2, and FIG. 5 a flow chart of an embodiment of the method according to the invention.

Specifications with numerical values are generally not to be understood as exact values, but also include a tolerance of +/−1% up to +/−10%.

FIG. 1 depicts a plan view of a preferred embodiment of the composite pane 10 according to the invention with a heatable camera window 2. The composite pane 10 can serve as a windshield of a passenger car. For this purpose, the camera window 2 is arranged centrally at the upper edge region of the composite pane 10 as a windshield. The camera window 2 serves as through-vision for a camera 5 (FIG. 3) or a camera system. The camera window 2 is defined as a region of the optical beam path of the camera 5 or of the camera system through the composite pane 10, in particular an inner pane 1 (of FIG. 3). A first electrically conductive transparent coating 6.1 is applied completely within the camera window 2. The first electrically conductive transparent coating 6.1 is hardly perceptible for the camera 5 and hardly interferes with through-vision through the composite pane 10.

In the installed position, the lower edge of the composite pane 10 is arranged downward toward the engine of a passenger car; its upper edge (O) positioned opposite the lower edge (U) is directed upward toward the roof. The camera window 2 is arranged roughly centrally in the vicinity of the upper edge (O).

FIG. 2 depicts an enlarged representation of the camera window 2 of FIG. 1. Two busbars 7.1 and 7.2, which are arranged on two opposite sides of the camera window such that when an electrical voltage is applied to the busbars, a current flows through the first electrically conductive transparent coating 6.1, are provided for the electrical contacting of the first electrically conductive transparent coating 6.1.

A first busbar 7.1 is arranged on the left edge region of the camera window 2 on the first electrically conductive coating 6.1. A second busbar 7.2 is arranged on the right edge region of the camera window 2 on the first electrically conductiven coating 6.1. The busbars 7.1 and 7.2 contain silver particles. They were applied on the first electrically conductive coating 6.1 by screen printing and then baked. The length of the busbars 7.1 and 7.2 corresponds approx. to the edge length of the camera window 2. When an electrical voltage is applied to the busbars 7.1 and 7.2, a uniform electrical heating current (indicated by arrows) flows through the first electrically conductive transparent coating 6.1. The camera window 2 is heated by the heating current. Each busbar 7.1, 7.2 is electrically conductively connected to a respective foil conductor 8.1, 8.2, which connects the busbars 7.1, 7.2 to an electrical voltage source 9.

A first foil conductor 8.1 is electrically conductively connected to the first busbar 7.1 via a soldering compound, an electrically conductive adhesive, or by simple placement and application of pressure within the composite pane 10. Similarly, a second foil conductor 8.2 is electrically conductively connected to the second busbar 7.2. The foil conductors 8.1 and 8.2 contain, for example, a tinned copper foil with a width of 10 mm and a thickness of 0.3 mm. The foil conductors 8.1 and 8.2 can also transition into connection cables that are connected to the voltage source 9. The voltage source 9 provides, for example, an on-board voltage customary for motor vehicles, preferably from 12 V to 15 V, and, for example, about 14 V. Alternatively, the voltage source 9 can also have higher voltages, for example, from 35 V to 45 V, and in particular 42 V.

In the example shown, the busbars 7.1, 7.2 have a constant thickness of, for example, about 0.1 mm and a constant specific resistance of, for example, 2.3 μohm-cm. When an electrical voltage is applied to the busbars 7.1, 7.2, an electrical current flows through the first coating 6.1. The busbars 7.1, 7.2 and their connections can be concealed by an opaque paint layer 11 (masking print).

FIG. 3 depicts a cross-section through the composite pane 10 according to the invention of FIG. 1 along the section line A-A'. The composite pane 10 comprises an inner pane 1 that is joined to an outer pane 4 via an intermediate layer 3. The intermediate layer 3 can comprise a film made of a thermoplastic polymer, preferably EVA, PU, PVB, or mixtures or copolymers or derivatives thereof. The intermediate layer 3 has a substantially constant thickness of 0.76 mm. Alternatively, or additionally, the intermediate layer 3 can comprise two films made of a thermoplastic polymer, preferably EVA, PU, or mixtures or copolymers or derivatives thereof. In an installed state, the inner pane 1 faces an interior, e.g., a vehicle interior.

The inner pane 1 and the outer pane 4 are made, for example, of soda lime glass. The outer pane 4 has, for example, a thickness of 2.1 mm; the inner panel, a thickness of 1.6 mm or 2.1 mm.

The first electrically conductive transparent coating 6.1 is arranged on the first surface (III) of the inner pane 1 facing the first intermediate layer 3. The first coating 6.1 can be electrically contacted via the two busbars 7.1, 7.2. The paint layer 11 frames the camera window 2 of the composite pane 10.

A second electrically conductive transparent coating 6.2 is arranged outside the camera window 2, likewise on the first surface (III) of the inner pane 1 facing the intermediate layer 3. In this exemplary embodiment, the first coating 6.1 is electrically isolated from the second coating 6.2 by a coating-free separation line 12. The separation line 12 has, for example, a width of 70 μm. The camera window 2 is formed by the separation line 12, since the separation line 12 completely surrounds the first electrically conductive coating 6.1. No electrical connection to a voltage source is provided on the second electrically conductive transparent coating 6.2. Consequently, also, no busbars are arranged on the second electrically conductive transparent coating 6.2.

The camera window 2 can be any region of the composite pane 10 or even of the inner pane 1 that has high transmission for the corresponding optical and electromagnetic signals. The camera window 2 is intended to provide an optical passage for the viewing area of the camera 5. In addition, a coating-free communication window inside the camera window 2 for transmission of electromagnetic radiation for other sensors attached to the composite pane 10 can be provided, whereby the communication window can have an area of 10% to 30% of the area of the camera window 2.

The camera window 2 is implemented transparent, in particular optically transparent. The camera 5 directed at the camera window 2 is situated in an encapsulation attached to the inner panel.

The first coating 6.1 and the second coating 6.2 are arranged on a surface (III) of the inner pane 1 facing the intermediate layer 3. In this embodiment, the first coating 6.1 and the second coating 6.2 are identical. The first and second electrically conductive coating 6.1, 6.2 are also sun-shading coatings with preferably at least one electrically conductive layer based on a metal, in particular based on silver. Such a sun-shading coating has, in particular, reflecting properties in the near infrared range, for example, in the range from 800 nm to 1500 nm.

FIG. 4 depicts a cross-section of the heatable camera window 2. The first surface (III) of the inner pane 1 and a second surface (II) of the outer pane 4 face one another and are joined to one another via the thermoplastic intermediate layer 3. A second surface (IV) of the inner pane 1 and a first surface (I) of the outer pane 4 face away from one another and from the thermoplastic intermediate layer 3. The first electrically conductive transparent coating 6.1 is arranged on the surface (III) of the inner pane 1. The first busbar 7.1 is arranged on the left edge region of the camera window 2 on the first electrically conductive coating 6.1. The second busbar 7.2 is arranged on the right edge region of the camera window 2 on the first electrically conductive coating 6.1.

It has been found that the heating action of the first coating is enhanced by the arrangement on side (III) in a way that could not be foreseen based on previously known heating devices.

FIG. 5 depicts a flow chart of an exemplary embodiment of the method according to the invention for producing the composite pane 10 with a heatable camera window 2. The method comprises the following steps:

- the first electrically conductive transparent coating 6.1 is applied to at least part the first surface (III) of the inner pane 1 (101),
- the two busbars 7.1, 7.2 are applied to the first electrically conductive transparent coating 6.1 on two opposite sides of the camera window 2, wherein the busbars 7.1, 7.2 are arranged such that when an electrical voltage is applied to the busbars 7.1, 7.2, a current flows through the first coating 6.1 (102),
- the first surface (III) of the inner pane (1) with the electrically conductive transparent coating (6.1) is joined to the surface (II) of the outer pane (4) via the thermoplastic intermediate layer (3).

LIST OF REFERENCE CHARACTERS

1 inner pane
2 camera window
3 intermediate layer
4 outer pane
5 camera
6.1 first electrically conductive coating
6.2 second electrically conductive coating
7.1 first busbar
7.2 second busbar
8.1 first foil conductor
8.2 second foil conductor
9 voltage source
10 composite pane
11 paint layer
12 separation line
(O) upper edge of the composite pane
(U) lower edge of the composite pane
(I) first surface of the outer pane facing away from the intermediate layer
(II) second surface of the outer pane facing the intermediate layer
(III) first surface of the inner pane facing the intermediate layer
(Iv) second surface of the inner pane facing away from the intermediate layer

The invention claimed is:

1. A composite pane with an electrically heatable camera window, comprising:

an outer pane and an inner pane, which are joined to one another flat via at least one thermoplastic intermediate layer, wherein the outer pane comprises a surface facing away from the intermediate layer and a second surface facing the intermediate layer, and the inner pane comprises a first surface facing the intermediate layer and a second surface facing away from the intermediate layer, at least one optically transparent camera window, inside the at least one optically transparent camera window, a first electrically conductive transparent coating for heating the camera window, wherein the first electrically conductive transparent coating is arranged on the first surface of the inner pane inside the camera window and has two busbars provided for connection to a voltage source, which are arranged on two opposite sides of the camera window such that when an electrical voltage is applied to the two busbars, a current flows through the first electrically conductive transparent coating, wherein the composite pane has a second electrically conductive transparent coating on the first surface of the inner pane, the second electrically conductive transparent coating being arranged outside the at least one optically transparent camera window, wherein no busbars are arranged on the second electrically conductive transparent coating, and wherein a coating-free separation line is provided for electrical insulation of the first electrically conductive transparent coating from the second electrically conductive transparent coating.

2. The composite pane according to claim 1, wherein at least one of two busbars has a width of 0.1 mm to 30 mm.

3. The composite pane according to claim 1, wherein the two busbars are formed from a printed and baked printing paste.

4. The composite pane according to claim 1, wherein the two busbars are implemented as two strips.

5. The composite pane according to claim 1, wherein a layer thickness of the two busbars is 5 μm to 40 μm.

6. The composite pane according to claim 1, wherein the first electrically conductive transparent coating is arranged over an entire surface on the first surface of the inner pane inside the camera window.

7. The composite pane according to claim 1, wherein the first electrically conductive transparent coating and the second electrically conductive transparent coating both include a silver layer.

8. The composite pane according to claim 1, wherein the first electrically conductive transparent coating and/or the second electrically conductive transparent coating have infrared-reflecting properties.

9. The composite pane according to claim 1, wherein the coating-free separation line at least partially surrounds the camera window.

10. The composite pane according to claim 9, wherein the coating-free separation line has a width of 30 μm to 200 μm.

11. The composite pane according to claim 1, wherein the camera window has at least one coating-free communication window for the transmission of electromagnetic radiation through the composite pane, wherein the communication window has an area of 10% to 30% of an area of the camera window.

12. The composite pane according to claim 1, wherein the composite pane is a windshield.

13. The composite pane according to claim 1, wherein the coating-free separation line completely surrounds the first electrically conductive transparent coating.

14. A method for producing a composite pane according to claim 1, comprising:

applying the first electrically conductive transparent coating to at least part of the first surface of the inner pane, applying the two busbars to the first electrically conductive transparent coating on two opposite sides of the camera window, wherein the two busbars are arranged such that when an electrical voltage is applied to the two busbars, a current flows through the first electrically conductive transparent coating, and joining the first surface of the inner pane with the electrically conductive transparent coating to the second surface of the outer pane via the thermoplastic intermediate layer.

15. A method comprising providing a composite pane according to claim 1 in a locomotion vehicle for traffic on land, in the air, or on water.

16. The composite pane according to claim 2, wherein the width is from 4 mm to 20 mm.

17. The composite pane according to claim 3, wherein the printed and baked printing paste contains metal particles and/or carbon.

18. The composite pane according to claim 4, wherein the two busbars are implemented as two parallel strips.

19. The composite pane according to claim 5, wherein the layer thickness of the two busbars is 8 μm to 20 μm.

20. The method according to claim 15, wherein the composite pane is a windshield.

* * * * *